United States Patent
Nakaseko

(10) Patent No.: US 8,780,245 B2
(45) Date of Patent: Jul. 15, 2014

(54) SOLID-STATE IMAGE PICKUP ELEMENT, METHOD OF DRIVING THE SAME, AND CAMERA SYSTEM

(75) Inventor: Tetsuji Nakaseko, Fukuoka (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 13/064,956

(22) Filed: Apr. 28, 2011

(65) Prior Publication Data

US 2011/0298954 A1    Dec. 8, 2011

(30) Foreign Application Priority Data

Jun. 8, 2010    (JP) .................................. 2010-130645

(51) Int. Cl.
*H04N 5/335* (2011.01)

(52) U.S. Cl.
USPC .......................................... 348/296; 348/294

(58) Field of Classification Search
USPC ................................. 348/296, 294
See application file for complete search history.

(56) References Cited

U.S. PATENT DOCUMENTS

| | | | | |
|---|---|---|---|---|
| 2007/0052811 A1* | 3/2007 | Suzuki | ........................ | 348/222.1 |
| 2007/0085921 A1* | 4/2007 | Kitagata et al. | ............... | 348/308 |
| 2008/0002036 A1* | 1/2008 | Ohwa | ........................ | 348/222.1 |
| 2008/0002038 A1* | 1/2008 | Suwa | ........................ | 348/229.1 |
| 2008/0049132 A1* | 2/2008 | Suzuki | ........................ | 348/308 |
| 2008/0192133 A1 | 8/2008 | Abiru et al. | | |
| 2008/0284876 A1 | 11/2008 | Makino | | |
| 2009/0167913 A1* | 7/2009 | Takenaka et al. | ............. | 348/301 |
| 2009/0201401 A1* | 8/2009 | Shirakawa | ..................... | 348/296 |
| 2011/0007173 A1* | 1/2011 | Takenaka et al. | .......... | 348/222.1 |

FOREIGN PATENT DOCUMENTS

| | | |
|---|---|---|
| EP | 2 040 464 A1 | 3/2009 |
| JP | 2008-193618 | 8/2008 |
| JP | 2008-288903 | 11/2008 |

OTHER PUBLICATIONS

Extended European Search Report issued Sep. 26, 2011 for corresponding European Application No. 11 16 8201.

* cited by examiner

*Primary Examiner* — Nicholas Giles
*Assistant Examiner* — Abdelaaziz Tissire
(74) *Attorney, Agent, or Firm* — Rader, Fishman & Grauer PLLC

(57) ABSTRACT

Disclosed herein is a solid-state image pickup element, including a pixel portion in which plural pixels each including a photoelectric conversion element for converting an optical signal into an electrical signal and accumulating therein the resulting electrical signal in accordance with an exposure period of time are disposed in a matrix; and a pixel driving portion adapted to control operations of the pixels in rows so as to carry out an electronic shutter operation and a reading operation of the pixel portion.

18 Claims, 11 Drawing Sheets

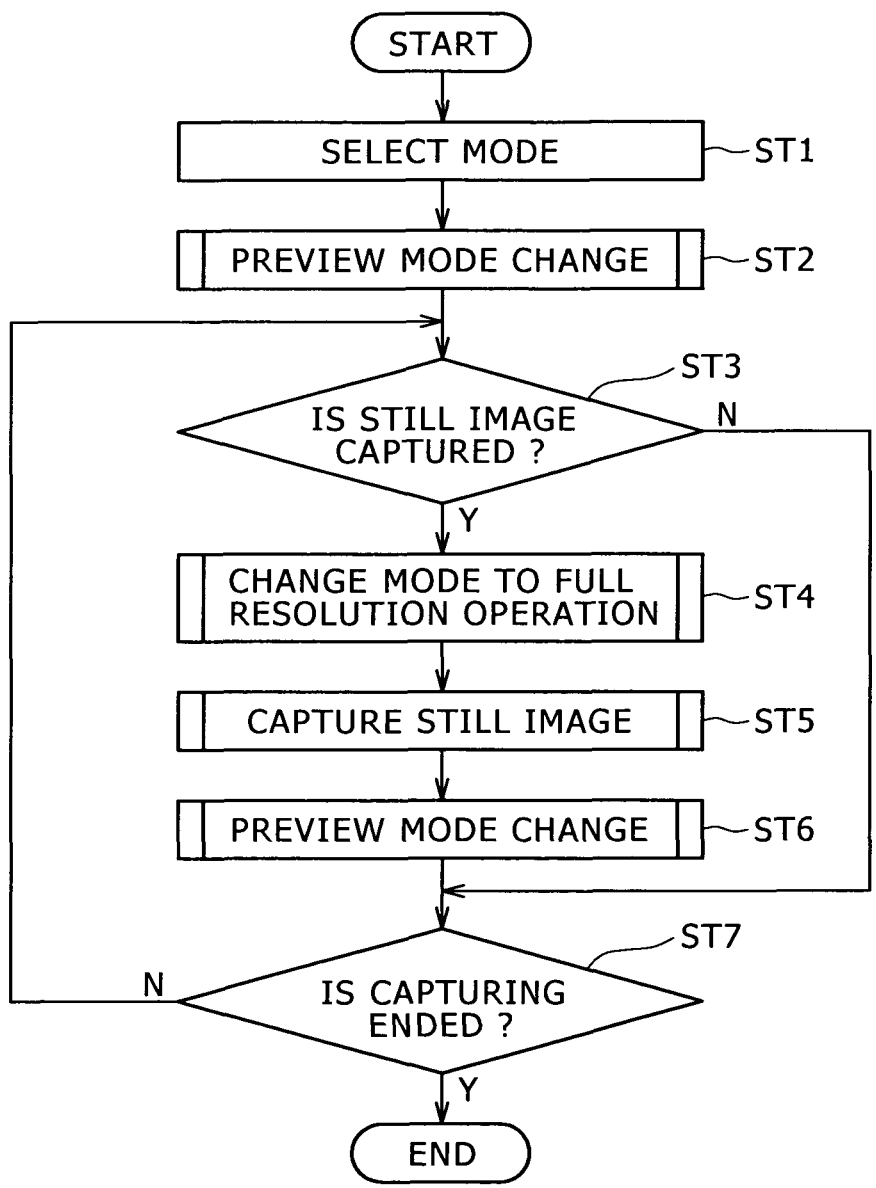

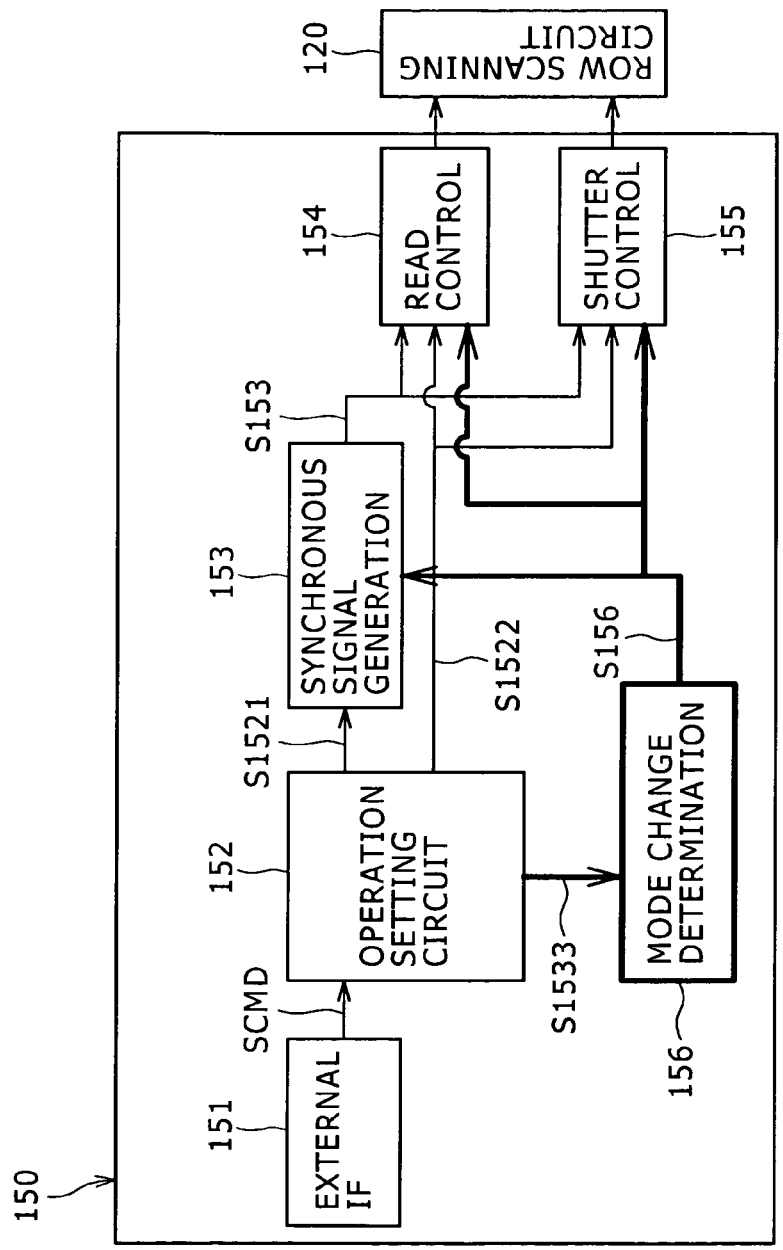

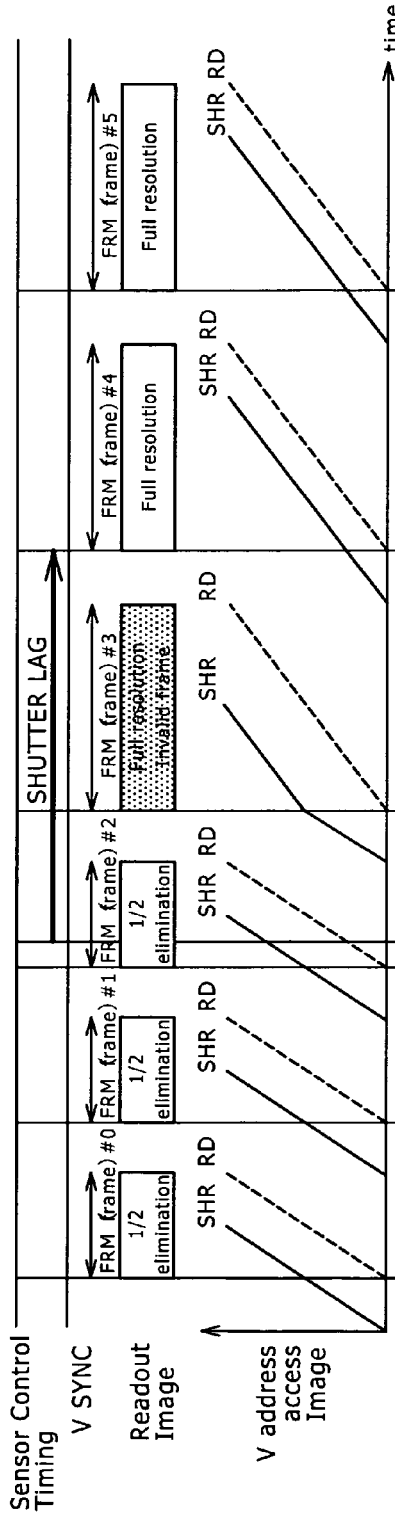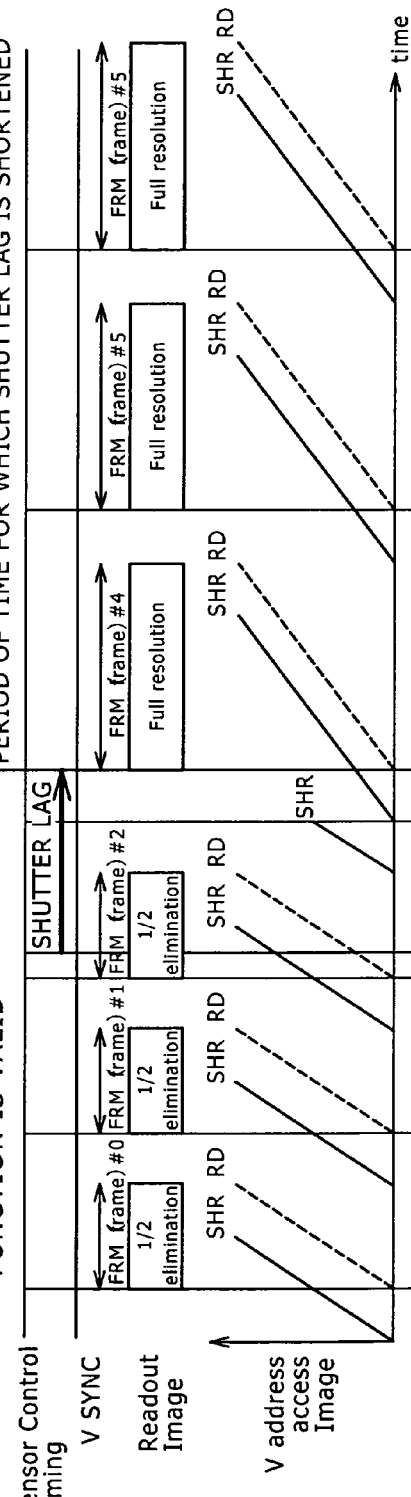

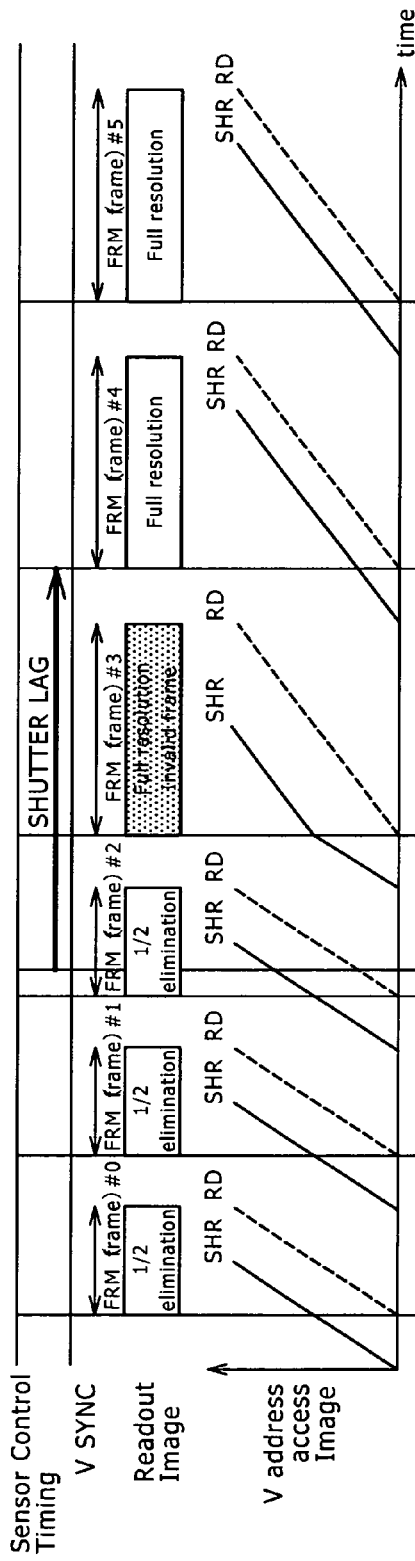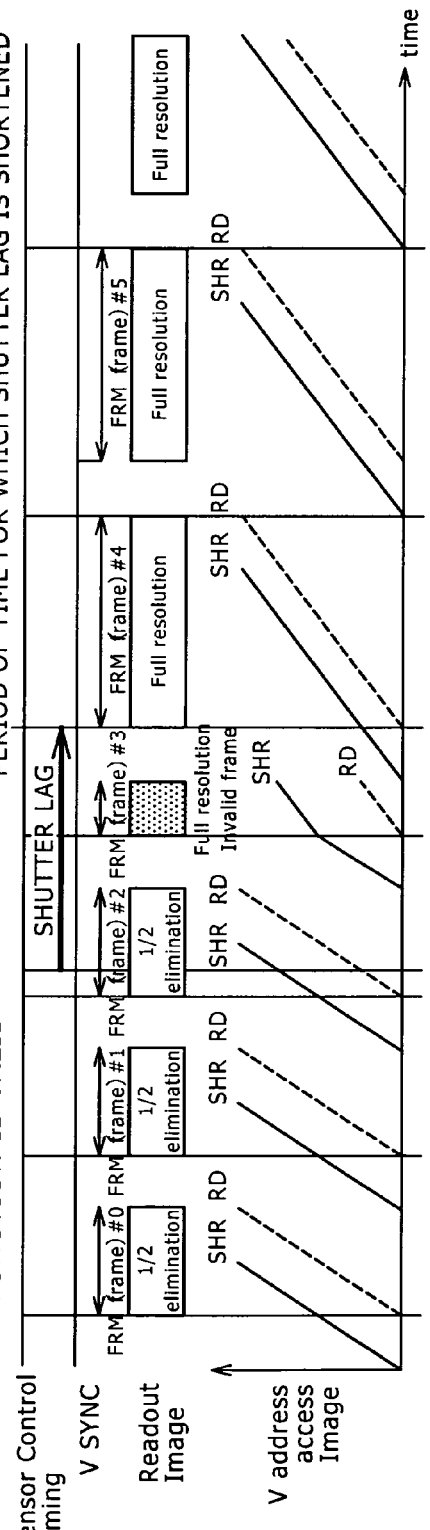

SOLID-STATE IMAGE PICKUP ELEMENT, METHOD OF DRIVING THE SAME, AND CAMERA SYSTEM

BACKGROUND

The present disclosure relates to a solid-state image pickup element, a method of driving the same, and a camera system using the same.

The Complimentary Metal Oxide Semiconductor (CMOS) Image Sensor (CIS) has a feature that it can relatively freely set a read address in comparison with the Charge Coupled Device (CCD) image sensor.

For example, an image sensor having functions such as "addition," "elimination," and "cutout" in addition to a function of reading signals from all of pixels of a sensor is widely used. In this case, with the function of "addition," pixel signals are read out from plural pixels at the same time, respectively. With the function of "elimination," pixel signals are intermittently read out from the pixels while rows and columns are skipped. Also, with the function of "cutout," pixel signal are read out only from a part of the pixels.

"Addition," "elimination," and "cutout" are carried out at the same time in some cases.

In an image sensor having the functions of "elimination," "addition," and "cutout," since a reading operation and a shutter operation become complicated, a shift register for row selection is not used, but a row scanning circuit (row selecting circuit) including a decoder is used in many cases.

The row selecting circuit has a function of outputting a row selection signal for a row address for a read row from which pixel signals are intended to be read out, and a shutter row from which electric charges accumulated in photoelectric conversion elements of pixels are discharged to carry out resetting in accordance with an address signal from an address decoder.

Shutter control and the like in such a row selecting circuit have been variously proposed until now. The shutter control and the like, for example, are described in Japanese Patent Laid-Open Nos. 2008-193618 and 2008-288903.

SUMMARY

Now, a present camera system is basically a system for displaying an image of a state (preview) before a still image is captured.

In the preview, an operation which is shrunk in scale due to the elimination or the like is carried out for all of the pixels with which a still image is captured.

For this reason, mode change is generated when the still image is captured. Thus, there is caused a problem that it takes given time (shutter lag time) to hold an unnecessary frame(s) between a phase of start of a shutter operation of a camera, and a time point at which the still image is captured.

In particular, the image sensor (solid-state image pickup element) having a function of generating a synchronous signal in an inside thereof involves such a problem that data on the unnecessary frame(s) is outputted in the phase of the mode change.

The image sensor having the function of generating the synchronous signals in the inside thereof is mainly used in mobile phones and the like.

Up to the present, a remarkable problem is not caused in a category in which a performance of an image processing system for the mobile phones or the like is relatively low because a period of time for image processing is longer than the shutter lag time of the image sensor.

However, along with an improved high performance of the image processing system, the shutter lag time of the image sensor becomes the time which is not negligible.

At the present time, the same function as that of a digital still camera is necessary for the camera as well in the mobile phone or the like, and thus it becomes a problem to shorten the shutter lag time.

The problem about the shutter lag time will be described below in more detail.

FIG. 1 is a timing chart showing a situation in a phase of general mode change in an image sensor.

In addition, FIG. 1 is an example of mode change from ½ elimination to Full Resolution.

Also, FIG. 1 shows the case where a Mode Change Command (MCC) is issued while data on a ½ elimination frame is read out from an image sensor, and setting of an exposure period, tET, of time is not changed.

In this example, the image sensor operates in accordance with a read reference, and thus issues an electronic shutter command before a period of time corresponding to the exposure period, tET, of time to a read address in order to realize the exposure period, tET, of time. In addition, in this example, there is adopted a system in which the mode change command MCC is reflected in accordance with a vertical synchronous signal V SYNC.

In FIG. 1, reference symbol SHR designates a vertical electronic shutter address and reference symbol RD designates a vertical read address.

In the system described above, a shutter in and before issue of the vertical synchronous signal V SYNC after the mode change command MCC has been issued carries out a shutter operation in accordance with addressing for the ½ elimination frame. Also, the shutter carries out the shutter operation in accordance with the addressing for the full resolution frame in and after the issue of the vertical synchronous signal V SYNC.

For this reason, in a frame FRM(frame) #1, exposure periods, tETn, tETm, of time become improper for the set exposure period, tET, of time.

Since the exposure period of time is not constant depending on the read addresses, it is very difficult to correct the period, tETn, of time by a signal processing circuit in a subsequent stage of the image sensor. In addition, it may be impossible to prevent the shutter operation for the frame FRM #1 from becoming earlier than the issue of the mode change command MCC.

For this reason, since the frame FRM #1 for which the exposure period of time is not constant is generated, the frame FRM #1 after the issue of the mode change command MCC becomes an unnecessary frame.

In this case, the shutter lag time ranging from the issue of the shutter command to a time point corresponding to a position of output of the frame FRM(frame) #2, and thus it is a problem to shorten the unnecessary frame for the purpose of shortening the shutter lag time.

The present disclosure has been made in order to solve the problems described above, and it is therefore desirable to provide a solid-state image pickup element which is capable of suppressing generation of a period of time for unnecessary output data, and thus is capable of properly reading out data on a frame right before mode change, a method of driving the same, and a camera system using the same.

In order to attain the desire described above, according to an embodiment of the present disclosure, there is provided a solid-state image pickup element including: a pixel portion in which plural pixels each including a photoelectric conversion element for converting an optical signal into an electrical signal and accumulating therein the resulting electrical signal in accordance with an exposure period of time are disposed in a matrix; and a pixel driving portion adapted to control operations of the pixels in rows so as to carry out an electronic shutter operation and a reading operation of the pixel portion, in which the pixel driving portion has a function of shortening a period of time for unnecessary output data for which data on an image for which the exposure period of time is not constant in a phase of mode change in which a change occurs in the exposure period of time is outputted with a synchronous signal generated as a reference.

According to another embodiment of the present disclosure, there is provided a method of driving a solid-state image pickup element, including: shortening a period of time for unnecessary output data for which data on an image for which an exposure period of time is not constant in a phase of mode change in which a change occurs in the exposure period of time is outputted with a synchronous signal generated as a reference when operations of plural pixels each including a photoelectric conversion element for converting an optical signal into an electrical signal and accumulating therein the resulting electrical signal in accordance with the exposure period of time are controlled in rows so as to carry out an electronic shutter operation and a reading operation of a pixel portion in which the plural pixels are disposed in a matrix.

According to still another embodiment of the present disclosure, there is provided a camera system including: a solid-state image pickup element; an optical system for forming an image of a subject on the solid-state image pickup element; and a signal processing circuit for processing an output image signal from the solid-state image pickup element, in which the solid-state image pickup element includes: a pixel portion in which plural pixels each including a photoelectric conversion element for converting an optical signal into an electrical signal and accumulating therein the resulting electrical signal in accordance with an exposure period of time are disposed in a matrix; and a pixel driving portion adapted to control operations of the pixels in rows so as to carry out an electronic shutter operation and a reading operation of the pixel portion, and the pixel driving portion has a function of shortening a period of time for unnecessary output data for which data on an image for which the exposure period of time is not constant in a phase of mode change in which a change occurs in the exposure period of time is outputted with a synchronous signal generated as a reference.

According to yet another embodiment of the present disclosure, there is provided a camera system including: a solid-state image pickup element; an optical system for forming an image of a subject on the solid-state image pickup element; and a signal processing circuit for processing an output image signal from the solid-state image pickup element, in which the solid-state image pickup element includes: a pixel portion in which plural pixels each including a photoelectric conversion element for converting an optical signal into an electrical signal and accumulating therein the resulting electrical signal in accordance with an exposure period of time are disposed in a matrix; a pixel driving portion adapted to control operations of the pixels in rows so as to carry out an electronic shutter operation and a reading operation of the pixel portion; a pixel driving portion carries out the electronic shutter control for a blanking period of time of a synchronous signal, carries out the reading operation synchronously with the synchronous signal, and starts the electronic shutter control again for the blanking period of time of the synchronous signal following mode change in accordance with setting of an exposure period of time following the mode change in a phase of the mode change in which a change occurs in the exposure period of time with the synchronous signal as a reference; and the blanking period of time of the synchronous signal following the mode change is longer than that in a phase of non-mode change.

As set forth hereinabove, according to the present disclosure, it is possible to suppress the generation of the period of time for the unnecessary output data, and it is possible to properly read out the data on the frame right before the mode change.

BRIEF DESCRIPTION OF THE DRAWINGS

FIG. 4 is a flow chart explaining mode change in the CMOS image sensor according to the first embodiment of the present disclosure;

FIG. 5 is a block diagram showing a first configuration of a timing control circuit in the CMOS image sensor according to the first embodiment of the present disclosure;

FIGS. 6A and 6B are timing charts explaining an effect obtained when the timing control circuit shown in FIG. 3 is applied, respectively;

FIGS. 7A and 7B are timing charts explaining an effect obtained when the timing control circuit shown in FIG. 3 is applied, respectively;

DETAILED DESCRIPTION OF PREFERRED EMBODIMENTS

Embodiments of the present disclosure will be described in detail hereinafter with reference to the accompanying drawings.

It is noted that the description will be given below in accordance with the following order:
1. First Embodiment (CMOS Image sensor (Solid-State Image Pickup Element)); and
2. Second Embodiment (Camera System).

1. First Embodiment

Figure 1:
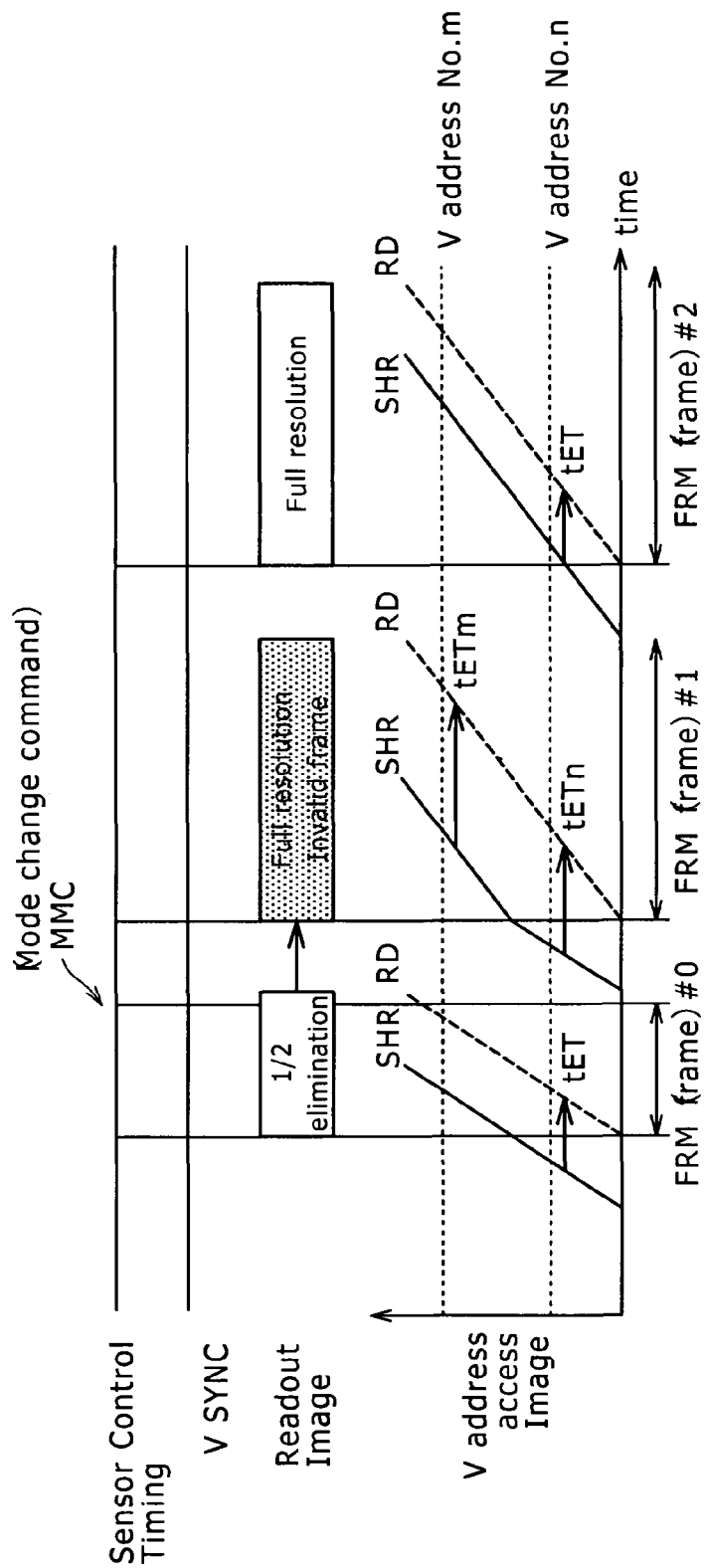
FIG. 1 is a timing chart showing a situation in a phase of general mode change in an image sensor.
Figure 2:
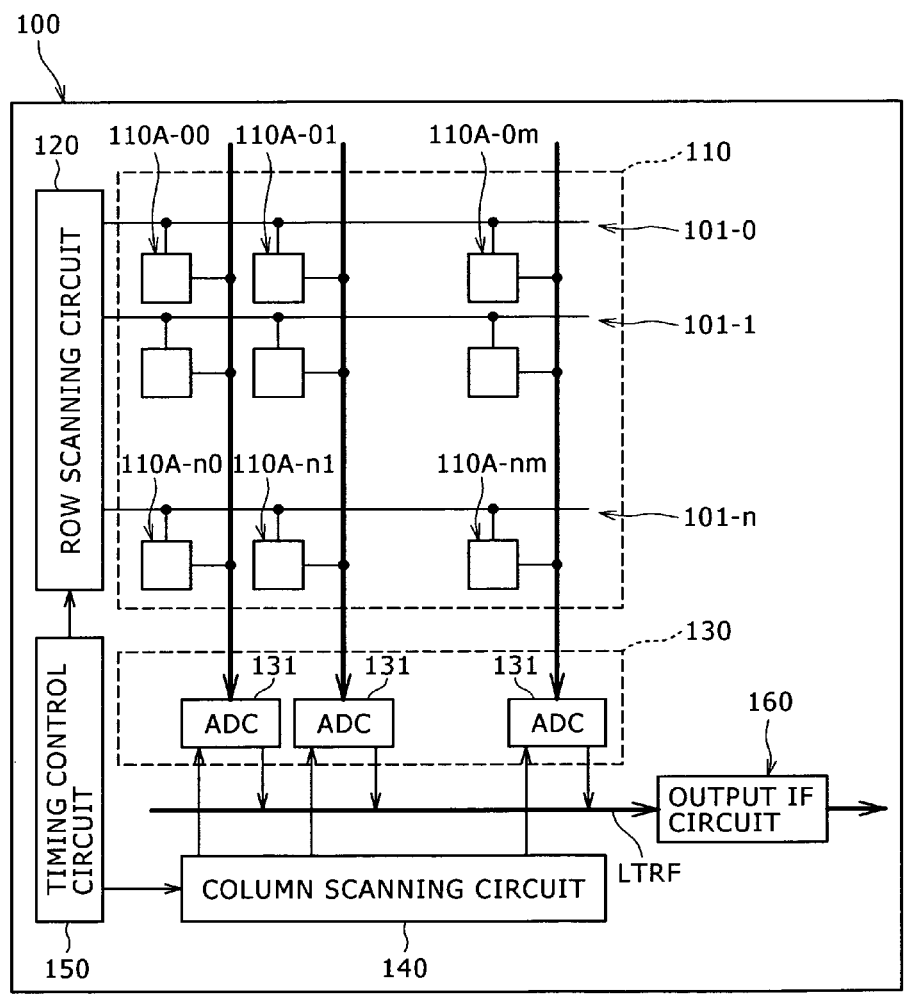
FIG. 2 is a block diagram showing a configuration of a CMOS image sensor (solid-state image pickup element) according to a first embodiment of the present disclosure.

FIG. 2 is a block diagram showing a configuration of a CMOS image sensor (solid-state image pickup element) according to a first embodiment of the present disclosure.

The CMOS image sensor 100 includes a pixel array portion 110, a row scanning circuit 120, a reading circuit 130, a column scanning circuit 140, a timing control circuit 150, and an output Interface (IF) circuit 160.

A pixel driving portion is composed of the row scanning circuit 120, the reading circuit 130, the column scanning circuit 140, and the timing control circuit 150.

The timing control circuit 150 in the first embodiment has a function of shortening a period of time for unnecessary output data for which data on an image for which an exposure period of time is not constant is outputted in a phase of mode change in which a change occurs in the exposure period of time with a synchronous signal generated as a reference.

For example, the timing control circuit 150 has a function of restarting a shutter operation when an unnecessary frame is generated in the phase of the mode change in an image sensor having a function of generating synchronous signals in the inside thereof.

The timing control circuit 150 can prevent the unnecessary frame from being generated by using the function of restarting the shutter operation.

The timing control circuit 150 uses a timing at which the shutter operation is restarted as a timing at which the data on the unnecessary frame is read out, thereby making it possible to properly read out data on a frame right before the mode change. As a result, special processing needs not to be executed in a signal processing circuit in a subsequent stage of the image sensor.

The functions of the timing control circuit 150 will be described later.

In the pixel array portion 110, plural pixel circuits 110A-00 to 110A-nm are two-dimensionally disposed in a matrix of n row×m column.

Figure 3:
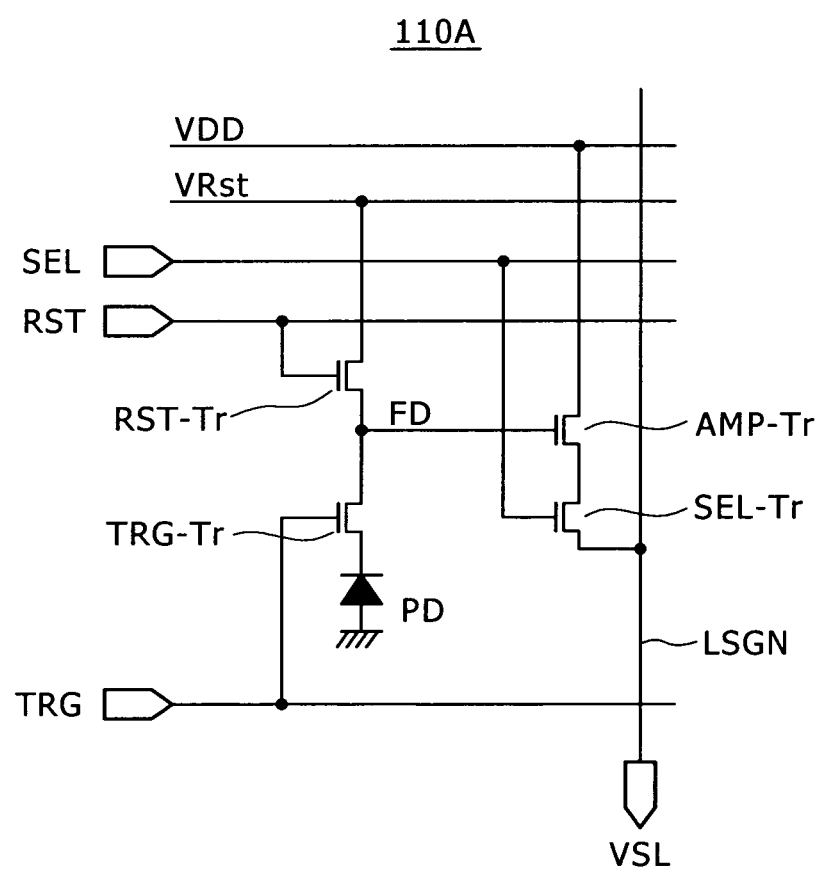
FIG. 3 is a circuit diagram showing a pixel circuit in the CMOS image sensor according to the first embodiment of the present disclosure.

FIG. 3 is a circuit diagram showing an example of a configuration of the pixel circuit in the first embodiment.

Each of the pixel circuits 110A-00 to 110A-nm has a photoelectric conversion element (hereinafter simply referred to as "a PD" in some cases), for example, a photodiode (PD).

In addition, the pixel circuit 110A has one transfer transistor TRG-Tr, one reset transistor RST-Tr, one amplification transistor AMP-Tr, and one selection transistor SEL-Tr for one photoelectric conversion element PD.

The photoelectric conversion element PD generates an amount of signal electric charges (electrons in this case) corresponding to a quantity of incident light to accumulate therein the resulting signal electric charges.

Hereinafter, a description will be given with respect to the case where the signal electric charge is the electron, and each of the transfer transistor TRG-Tr, the reset transistor RST-Tr, the amplification transistor AMP-Tr, and the selection transistor SEL-Tr is an N-channel MOS transistor. However, the case may also be adopted where the signal electric charge is a hole, and each of the transfer transistor TRG-Tr, the reset transistor RST-Tr, the amplification transistor AMP-Tr, and the selection transistor SEL-Tr is a P-channel MOS transistor.

In addition, the first embodiment is also effective in the case where the transfer transistor TRG-Tr, the reset transistor RST-Tr, the amplification transistor AMP-Tr, and the selection transistor SEL-Tr are shared among the plural photoelectric conversion elements, or in the case where 3 transistor (3 Tr) pixel not having the selection transistor SEL-Tr is adopted.

The transfer transistor TRG-Tr is connected between a cathode of the photoelectric conversion element PD and a Floating Diffusion (FD), and is controlled through a control line TRG.

The transfer transistor TRG-Tr is selected for a period of time for which the control line TRG is held at a High (H) level to become a conduction state, thereby transferring the electrons generated through the photoelectric conversion in the photoelectric conversion element PD to the FD.

The reset transistor RST-Tr is connected between a power source line VRst and the FD, and is controlled through a control line RST.

The reset transistor RST-Tr is selected for a period of time for which the control line RST is held at the H level to become a conduction state, thereby resetting the FD to a potential of the power source line VRst.

The amplification transistor AMP-Tr and the selection transistor SEL-Tr are connected in series between a power source line VDD and an output signal line LSGN.

The FD is connected to a gate terminal of the amplification transistor AMP-Tr, and the selection transistor SEL-Tr is controlled through a control line SEL.

The selection transistor SEL-Tr is selected for a period of time for which the control line SEL is held at the H level to become a conduction state. As a result, the amplification transistor AMP-Tr outputs a signal VSL corresponding to the potential of the FD to the output signal line LSGN.

Since the pixel circuits 110A-00 to 110A-nm are disposed in a matrix of n row×m column in the pixel array portion 110, n control lines SELs, n control lines RSTs, and n control lines TRGs are disposed, and m output signal lines LSGNs for the signals VSLs are disposed.

In FIG. 2, the control lines SELs, the control lines RSTs, and the control lines TRGs are expressed in the form of n row scanning control lines 101-0 to 101-n, respectively.

The row scanning circuit 120 drives the pixels in a shutter row and a read row through the row scanning control lines in accordance with the control made by a shutter control portion and a read control portion of the timing control circuit 150.

The row scanning circuit 120 outputs row selection signals RD and SHR for a row address for a read row in which a signal is intended to be read out, and a shutter row in which the electric charges accumulated in the photoelectric conversion element PD are intended to be discharged to carry out resetting in accordance with an address signal.

The read circuit 130 reads out a signal VSL outputted to the output signal line LSGN in accordance with a control signal from a sensor controller (not shown), and outputs a read signal to the transfer line LTRF in accordance with the column scanning made by the column scanning circuit 140, thereby outputting the read signal to the outside by the output IF circuit 160.

The read circuit 130 executes predetermined processing for the signals VSLs outputted from the pixel circuits 110A belonging to the read rows selected by the drive of the row scanning circuit 120 through the output signal lines LSGNs, and, for example, temporarily holds therein pixel signals obtained after completion of the predetermined signal processing.

A configuration of a circuit including a sample-and-hold circuit for sampling and holding a signal outputted through the output signal line LSGN, for example, can be applied to the read circuit 130.

Or, a configuration of a circuit including the sample-and-hold circuit, and having a function of removing a fixed pattern noise, peculiar to a pixel, such as a reset noise or a dispersion of threshold values of amplification transistors by executing Correlation Double Sampling (CDS) processing can also be applied to the read circuit 130.

In addition, a configuration which is given an Analog-to-Digital (AD) conversion function, thereby converting a signal level into a digital signal can also be applied to the read circuit 130.

In the CMOS image sensor 100 shown in FIG. 2, the read circuit 130 is configured in the form of a column ADC portion in which an Analog-to-Digital Converter (ADC) 131 is disposed every column.

With the column ADC portion, the AD conversion is carried out in columns, and data obtained after completion of the AD conversion is outputted in the form of a read signal to the transfer line LTRF in accordance with the scanning made by the column scanning circuit 140, and the resulting read signal is outputted to the outside by the output IF circuit 160.

The timing control circuit 150 generates timing signals necessary for the processing in the pixel array portion 110, the row scanning circuit 120, the column scanning circuit 140, and the like.

In the CMOS image sensor 100 shown in FIG. 2, the pixel array portions 110 are controlled in columns. For this reason, for example, the (m+1) pixels composed of the pixel circuits 110A-00 to 110A-0m are simultaneously and in parallel controlled though the row scanning control line 101-0, whereby the pixel signals are inputted to the column ADC portion through the output signal lines LSGNs connected to the pixel circuits 110A-00 to 110A-0m in the pixel array portion 110.

With the column ADC portion, the AD conversion is carried out in columns, and the data obtained through the AD conversion is transferred to the output IF circuit 160 by the column scanning circuit 140. The output IF circuit 160 formats the data transferred thereto into data having a form allowing the data to be received by the signal processing circuit in a subsequent stage, and outputs the resulting data.

The present disclosure can be applied to such an image sensor. In addition, the image sensor as described above is merely an example in configuration, and also the present disclosure can also be applied to any other suitable configuration in addition to the configuration described above.

Hereinafter, a concrete description will be given with respect to a function of restarting a shutter operation when the unnecessary frame is generated in the phase of change of the mode such as the full resolution read mode or the elimination mode in the timing control circuit 150 in the first embodiment.

It is noted that in the following description, "the shutter lag" represents a period of time ranging from the issue of the mode change command MCC to start of a valid frame after completion of the mode change.

In addition, "the unnecessary frame" represents a frame having an image for which the exposure period of time is not constant and data on which is outputted by the image sensor.

In the CMOS image sensor 100 shown in FIG. 2, basically, the timing control circuit 150 has a function of generating synchronous signals, and a function of resetting electronic shutter addresses with the synchronous signal as a reference.

When all of the pixels in the solid-state image pickup element in which the pixels are disposed in n rows are accessed, the electronic shutter addresses are repetitively accessed from the first row to the n-th row. There is known a method of partially skipping the electronic shutter addresses, eliminating the electronic shutter addresses, or accessing only a part of the electronic shutter addresses depending on the driving method.

The resetting of the electronic shutter addresses stated in this description represents that when with the drive in the normal state described above, the first row of or only a part of the electronic shutter addresses is accessed by a desired trigger, an address is forcibly changed to an arbitrary start address. The case where the n-th row of the electronic shutter addresses in the phase of the normal drive, or only a part of the electronic shutter addresses is accessed, and the change from the final electronic shutter address to the start address by a special access are not included in the resetting of the electronic shutter addresses.

As a first configuration, the timing control circuit 150 has a function of carrying out the electronic shutter operation, and the reading operation with the synchronous signal generated as a reference to reset the electronic shutter addresses in the phase of the mode change in which a change occurs in the exposure period of time, thereby preventing the period of time for the unnecessary output data from being generated.

The timing control circuit 150 has a function of determining whether or not a change occurs in the exposure period of time in a phase of change of setting for the driving method. Thus, the timing control circuit 150 resets the electronic shutter addresses in the phase of the mode change in which a change occurs in the exposure period of time in accordance with the determination result, thereby preventing the period of time for the unnecessary output data from being generated.

As a second configuration, the timing control circuit 150 has a function of carrying out the electronic shutter operation and the reading operation with the synchronous signal generated as a reference, and interpolating a shortened frame into the phase of the mode change in which a change occurs in the exposure period of time, thereby shortening the period of time for the unnecessary output data.

In this case as well, the timing control circuit 150 has the function of determining whether or not a change occurs in the exposure period of time in the phase of change of setting for the driving method, and also has a function of interpolating the shortened frame into the phase of the mode change in which a change occurs in the exposure period of time in accordance with the determination result, thereby shortening the period of time for the unnecessary output data.

In addition, as a third configuration, the timing control circuit 150 has the function of carrying out the electronic shutter operation and the reading operation with the synchronous signal generated as the reference, and interpolating the shortened frame in the phase of the mode change in which a change occurs in the exposure period of time, thereby shortening the period of time for the unnecessary output data. Also, the timing control circuit 150 has a function of inhibiting data on the shortened frame thus interpolated from being outputted as the output data to the outside.

In this case as well, the timing control circuit 150 has the function of determining whether or not a change occurs in the exposure period of time in the phase of change of setting of the driving method, and also has a function of interpolating the shortened frame in the phase of the mode change in which a change occurs in the exposure period of time in accordance with the determination result, thereby shortening the period of time for the unnecessary output data. Also, the timing control circuit 150 has the function of inhibiting the data on the shortened frame thus interpolated from being outputted as the output data to the outside.

Next, a description will be given with respect to the mode change in the image sensor.

FIG. 4 is a flow chart explaining an example of the mode change in the image sensor.

Also, FIG. 4 shows a flow chart of mode change in a phase of capturing a still image in a general camera system.

The example of FIG. 4 shows processing for change from a preview mode in an elimination operation to still image capturing in a full resolution operation in the form of Steps ST1 to ST7.

Basically, many of the camera systems are systems for displaying a state (preview) before a still image is captured on a monitor.

In the preview, an operation in which an image is shrunk by carrying out the elimination or the like is carried out for all of the pixels with which the still image is captured.

For this reason, there is caused a problem that the mode change is generated when the still image is captured, and it takes given time (shutter lag time) to hold the frame becoming unnecessary for a period of time between the phase of start of the electronic shutter operation of the camera, and the phase of capturing the still image.

In the flow chart shown in FIG. 4, a timing at which an affirmative determination (Y) is carried out in branch of "IS STILL IMAGE CAPTURED?" in Step ST3 becomes the phase of start of the electronic shutter operation.

After that, in the image sensor, the mode is changed to the full resolution operation (ST4) in order to capture the still image, and the still image is then captured (ST5).

Many present camera systems adopt the method described above and thus involve a mechanism in which the mode change is necessarily generated.

First Configuration of Timing Control Circuit

Next, concrete configurations of the timing generating circuit 150 will be described.

FIG. 5 is a block diagram showing a first configuration of the timing generating circuit 150 in the first embodiment.

The timing generating circuit 150 shown in FIG. 5 includes an external IF circuit 151, an operation setting circuit 152 as a so-called register bank, a synchronous signal generating circuit 153, a read control circuit 154, a shutter control portion 155, and a mode change determining portion 156.

Since various kinds of synchronous signal generating methods are known, an example thereof will be shown below.

In the timing control circuit 150, the image sensor receives a setting command SCMD from a master of a camera system through the external IF circuit 151.

The setting command SCMD thus received is decoded in the operation setting circuit 152, and the resulting setting is delivered to each of the functional portions.

The synchronous signal generating portion 153 is set in a capturing state in accordance with a signal S1521 from the operation setting circuit 152 to start to generate synchronous signals (generate a vertical synchronous signal, a horizontal synchronous signal and the like).

In response to an operation setting signal S1522 from the operation setting circuit 152, and a synchronous signal S153 generated in the synchronous signal generating portion 153, the read control portion 154 and the shutter control portion 155 drive the row scanning circuit 120.

A frame in which an accumulation period of time is not constant is generated after completion of the mode change depending on the setting change contents.

The mode change determining portion 156 detects setting change causing a state in which the accumulation period of time is not constant in accordance with a setting information signal S1523 from the operation setting circuit 152.

The mode change determining portion 156 informs the synchronous signal generating portion 153, the read control portion 154, and the shutter control portion 155 of the detection results by using an information signal S156 representing the generation of the unnecessary frame.

In response to the information signal S156 representing the generation of the unnecessary frame, the synchronous signal generating portion 153 executes shortened frame processing for inhibiting the unnecessary frame, for example from being outputted, processing for using a vertical synchronous signal interval (blanking period of frame) as the exposure period of time after completion of the mode change.

In response to the information signal S156 representing the generation of the unnecessary frame, the read control portion 154 executes processing for inhibiting the read control from being carried out.

In response to the information signal S156 representing the generation of the unnecessary frame, the shutter control portion 155 interrupts the shutter control which has already been carried out, and starts the shutter control again from the head of the frame in accordance with the setting of the exposure period of time after completion of the mode change.

Executing the processing described above makes it possible to prevent the unnecessary frame from being generated.

The blanking period of time for non-mode change for which the mode change is not generated is about twice as long as the blanking period of time up to the frame processing after completion of the mode change in this case.

The configuration and processing described above correspond to the first configuration described above.

FIGS. 6A and 6B are timing charts explaining an effect when the timing control circuit shown in FIG. 3 is applied.

Also, FIGS. 6A and 6B are contents representing that the shutter lag is shortened by using a shutter lag shortening function (a function of restarting the shutter operation when the unnecessary frame is generated in the phase of the mode change) in the first embodiment, and thus show the effect obtained when the first configuration described above is adopted.

The preview continues in the order of the frames FRM (frame) #0 to #2, and a mode change command MCC is issued in the middle of the frame FRM #2. The mode change is generated in the frame next to the frame FRM #2.

When the shutter lag shortening function is invalid, as shown in FIG. 6A, the exposure period of time for the frame FRM #3 is not uniform within the frame.

For this reason, the frame FRM #3 becomes the unnecessary frame, and thus the frames each capable of being utilized as the still image lie in in and after a frame FRM #4.

On the other hand, when the shutter lag shortening function is valid, as shown in FIG. 6B, the frame FRM #3 is not generated because the processing for inhibiting the unnecessary frame from being generated is executed. Also, the still image for which the proper exposure period of time is obtained is obtained in and after the frame FRM #4.

As described above, the period of time can be shortened by up to about full resolution one frame depending on presence or absence of the shutter lag shortening function.

FIGS. 7A and 7B are timing charts explaining an effect when the timing control circuit shown in FIG. 3 is applied.

Also, FIGS. 7A and 7B are contents of a technique for shortening the unnecessary frame, and show an effect when the second configuration described above is adopted.

In the case of the system to which it may be impossible to apply the technique, shown in FIGS. 6A and 6B, for inhibiting the unnecessary frame from being generated, use of the technique for shortening the unnecessary frame makes it possible to obtain the same effect as that in the technique shown in FIG. 5.

When the shutter lag shortening function is valid, the processing for shortening the unnecessary frame is executed instead of executing the processing for inhibiting the unnecessary frame from being generated.

Comparison of the technique shown in FIGS. 7A and 7B with the technique shown in FIG. 5 results in that although a period of time necessary to shorten the unnecessary frame increases, the same effect as that in the technique shown in FIG. 5 can be obtained when an increase in period of time is small.

Second Configuration of Timing Control Circuit

Figure 8:
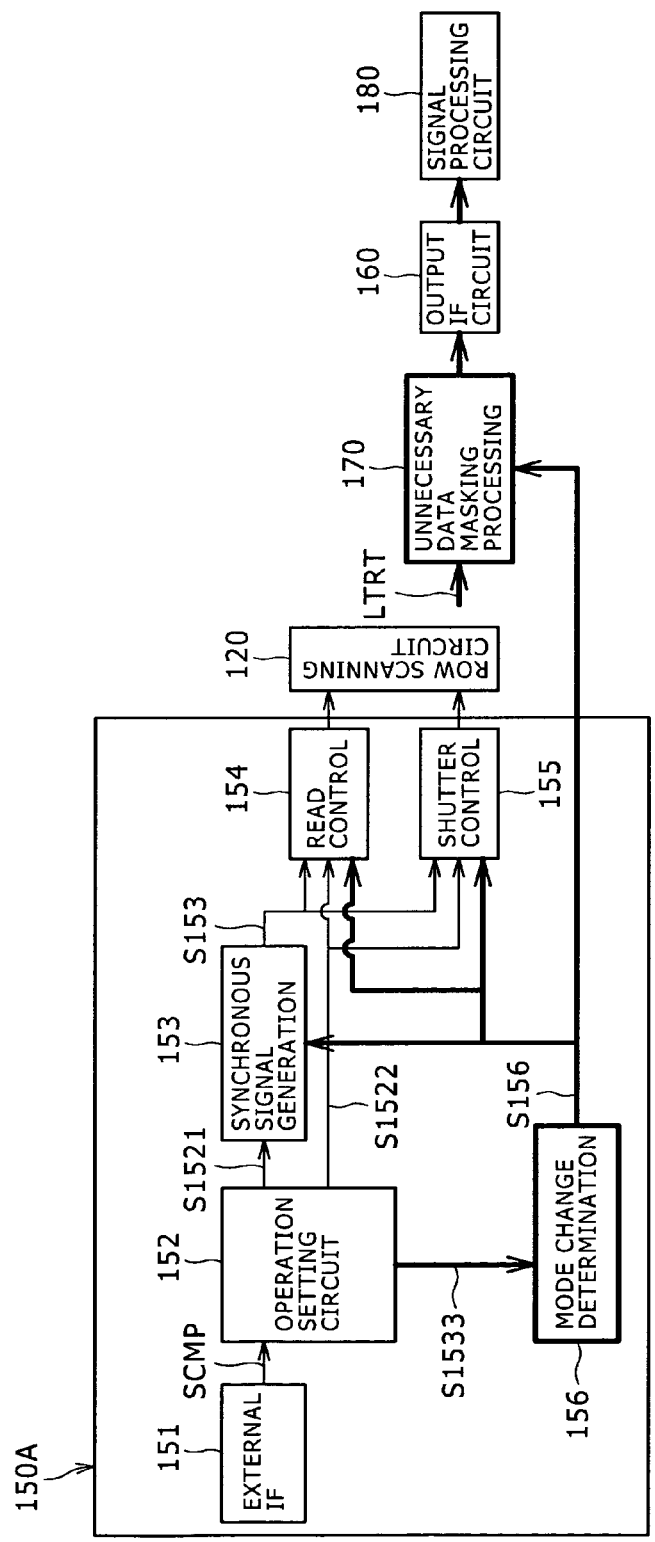
FIG. 8 is a block diagram showing a second configuration of the timing control circuit in the CMOS image sensor according to the first embodiment of the present disclosure.

FIG. 8 is a block diagram showing a second configuration of a timing control circuit 150A in the first embodiment.

Also, FIG. 8 shows a configuration to which control in accordance with which data on the shortened frame associated with the technique shown in FIGS. 7A and 7B is not outputted to a signal processing circuit in a subsequent stage is added in addition to the configuration and the function shown in FIG. 5, and corresponds to the third configuration described above.

With the technique, associated with the technique shown in FIGS. 7A and 7B, for shortening the unnecessary frame, the shortened unnecessary data is generated.

It is possible that it may be impossible to properly receive the shortened unnecessary data in the signal processing circuit 180 in the subsequent stage. The reason for this is because when a size of the image data is set from the signal processing circuit 180 in the subsequent stage, the data whose size is different from the specified size is outputted.

For this reason, for a period of time for the information signal S156 representing the generation of the unnecessary frame, the processing for inhibiting the data from being received as image data in the signal processing circuit 180 in the subsequent stage is executed in a mask processing portion 170.

Processing including removing the synchronous code and making the synchronous code identical to that in the phase of the blanking is exemplified.

Figure 9:
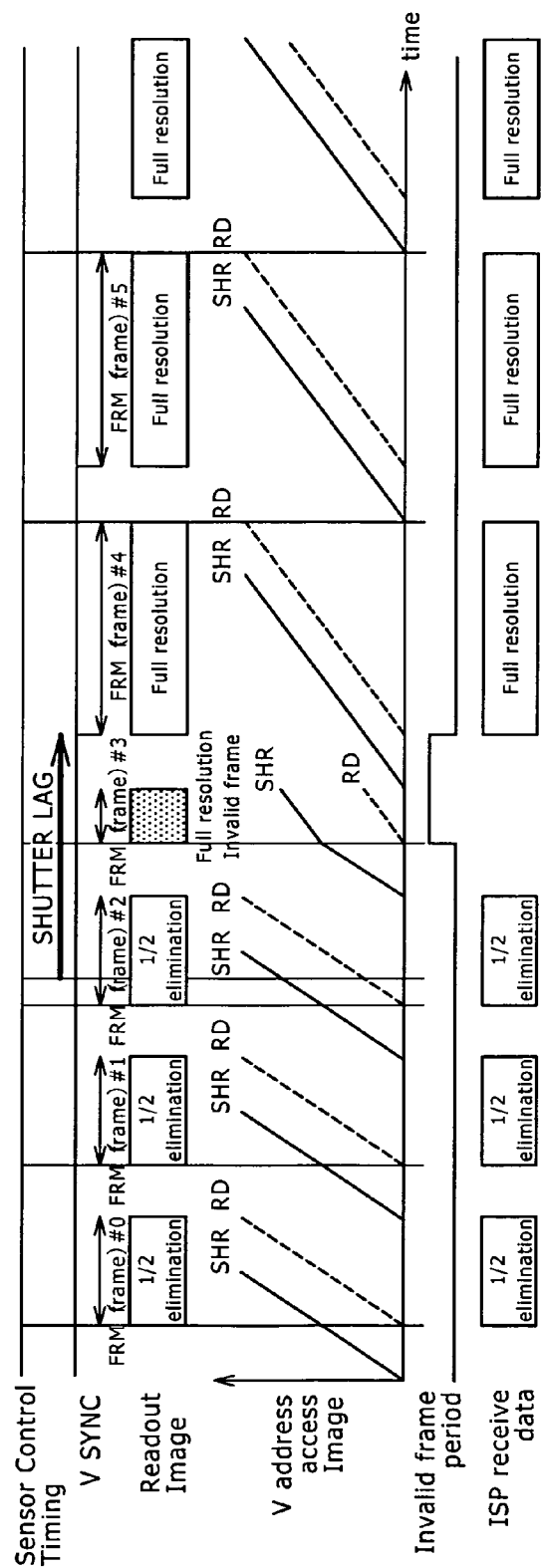
FIG. 9 is a timing chart showing contents of processing for masking unnecessary data in FIG. 8.

FIG. 9 is a timing chart showing contents of processing for masking the unnecessary data in the technique shown in FIG. 8.

An information signal representing the generation of the unnecessary frame (Invalid Frame Period Signal) S156 becomes valid (for the Hi period of time) in the frame in which the unnecessary data is generated, and thus the image data (ISP receive data) which is intended to be outputted to the signal processing circuit 180 in the subsequent stage is not generated.

Executing this processing makes it possible to prevent a reception error from being generated due to mismatch in size of the image data in the signal processing circuit 180 in the subsequent stage.

According to the first embodiment described above of the present disclosure, the following effects can be obtained:

(1) in the image sensor having the function of generating the synchronous signals, the shutter lag time in the phase of the mode change can be shortened by up to about one frame;

(2) the invalid frame in the phase of the mode change can be shortened; and (3) since in the image sensor having the effects described above, the change needs not to be carried out for the signal processing circuit in the subsequent stage, it is easy to carry out displacement to the existing system.

It is noted that the mode change contains therein various kinds of forms such as a change from a preview mode to an operation mode, a change from a first moving image mode to a second moving image mode, and a change between a moving image mode and a still image mode in addition to the change from the preview mode to the full resolution still image mode.

The ground of the effects of shortening the shutter lag is described as follows.

Figure 10:
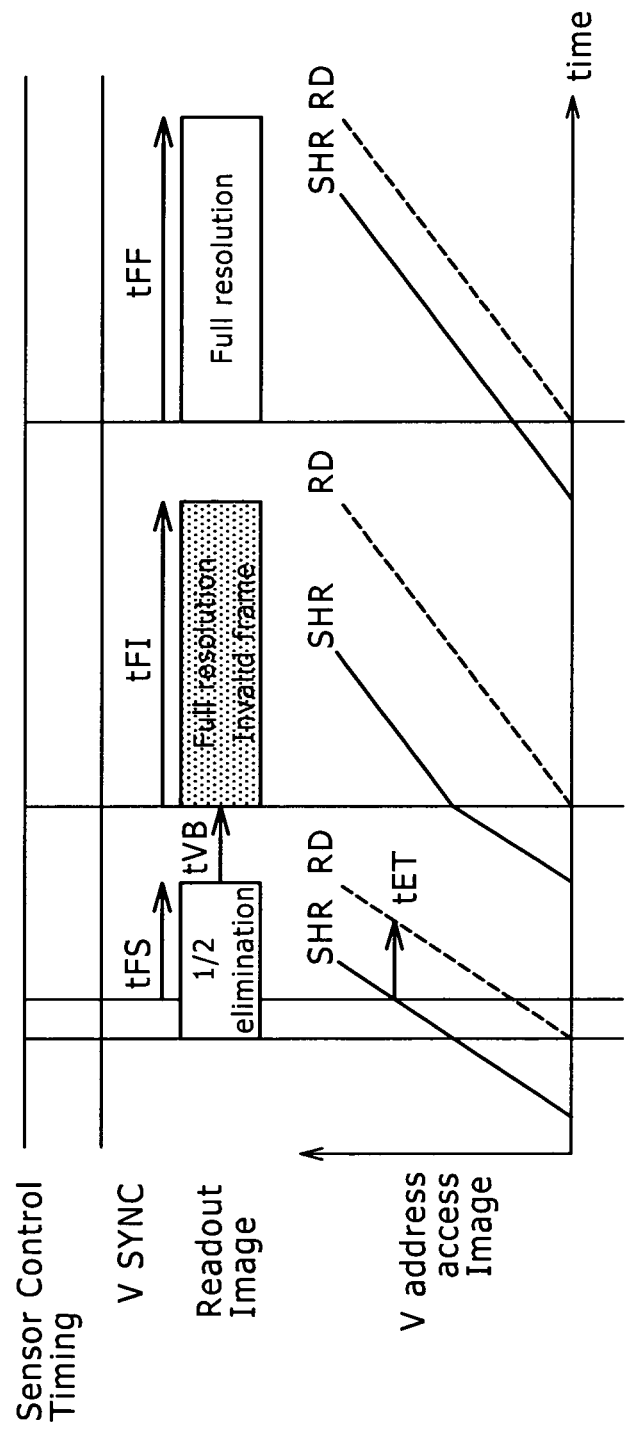
FIG. 10 is a timing chart showing parameters with respect to time showing a ground of an effect of shortening a shutter lag.

FIG. 10 is a timing chart showing parameters with respect to time for explaining the ground of the effects of shortening the shutter lag.

In this case, it is possible to shorten a period of time necessary to output data on up to about full resolution one frame.

In the cases of the first configuration, the second configuration, and the third configuration for which the parameters with respect to the time are defined in the following manner, it is possible to obtain effects of the shortening of the shutter lag as will be described below:

(1) "tFS" is defined as a period of time necessary to output the image data up to the last of the frame after the mode change command MCC was issued in the phase of the preview;

(2) "tFI" is defined as a period of time necessary to output the pixel data of the unnecessary frame;

(3) "tFF" is defined as a period of time necessary to output one frame pixel data in the phase of the full resolution capturing;

(4) "tVB" is defined as a blanking period of time; and (5) "tET" is defined as an exposure period of time.

In the case of the first configuration, the shutter lag time is described as follows.

In the case of the existing system, the shutter lag time gets [tFS+tVB+tFF+tVB] as a maximum value, and gets [tFF+tVB] as a minimum value.

On the other hand, in the system in the first embodiment, the shutter lag time gets [tFS+tVB+tET] as a maximum value, and gets [tET] as a minimum value.

An effect (difference) of the shortening of the shutter lag time becomes [tFI+tVB−tET]. Thus, when the exposure period, tET of time is minimum, the shutter lag time is shortened by a period of time for approximately the full resolution one frame.

In the case of the second and third configurations, the shutter lag time is described as follows.

In the case of the existing system, the shutter lag time gets [tFS+tVB+tFF+tVB] as a maximum value, and gets [tFF+tVB] as a minimum value.

On the other hand, in the case of the system in the first embodiment, the shutter lag time gets [tFS+tVB+tFI+tVB+tET] as a maximum value, and gets [tFI+tVB+tET] as a minimum value.

An effect (difference) of the shortening of the shutter lag time becomes [tFF−(tFI+tET)]. Thus, when the period, tFI, of time necessary to output the pixel data on the unnecessary frame, and the exposure period, tET, of time are each minimum, the shutter lag time is shortened by a period of time for approximately the full resolution one frame.

The solid-state image pickup element having the effects as described above can be applied as an image pickup device of a digital camera or a video camera.

2. Second Embodiment

Figure 11:
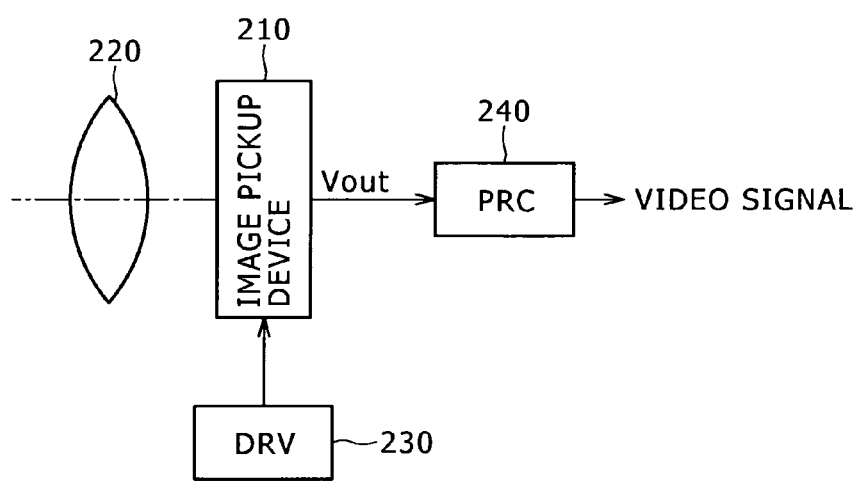
FIG. 11 is a block diagram showing a configuration of a camera system according to a second embodiment of the present disclosure to which the solid-state image pickup element according to the first embodiment of the present disclosure is applied.

FIG. 11 is a block diagram showing a configuration of a camera system, according to a second embodiment of the present disclosure, to which the solid-state image pickup element according to the first embodiment of the present disclosure is applied.

As shown in FIG. 11, the camera system 200 includes an image pickup device 210 to which the CMOS image sensor (solid-state image pickup element) 100 of the first embodiment can be applied.

In addition, the camera system 200 includes an optical system for guiding an incident light to a pixel area of the image pickup device 210 (for forming an image of a subject). An example of such an optical system is a lens 220 for forming an image corresponding to the incident light (image light) on an image capturing surface.

Also, the camera system 200 includes a driving circuit (DRV) 230 and a signal processing circuit (PRC) 240. In this case, the driving circuit 230 drives the image pickup device 210. Also, the signal processing circuit 240 processes an output signal from the image pickup device 210.

The driving circuit 230 includes a timing generator (not shown) for generating various kinds of timing signals including a start pulse and a clock pulse in accordance with which circuits within the image pickup device 210 are driven. Thus, the driving circuit 230 drives the image pickup device 210 by a predetermined timing signal.

In addition, the signal processing circuit 240 executes predetermined signal processing for the output signal from the image pickup device 210.

An image signal obtained through the predetermined processing in the signal processing circuit 240 is recorded in a recording medium such as a memory. Image information recorded in the recording medium is hard-copied by using a printer or the like. In addition, the image signal obtained through the processing in the signal processing circuit 240 is displayed in the form of a moving image on a monitor composed of a liquid crystal display device or the like.

As described above, an image pickup apparatus such as a digital still camera is equipped with the CMOS image sensor (solid-state image pickup element) 100 described above as the image pickup device 210, thereby making it possible to realize a high-performance camera which consumes a less electric power.

The present disclosure contains subject matter related to that disclosed in Japanese Priority Patent Application JP 2010-130645 filed in the Japan Patent Office on Jun. 8, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A solid-state image pickup element, comprising:
   a pixel portion having a plurality of pixels disposed in a matrix, at least one of said pixels comprising a photoelectric conversion element configured to convert an optical signal into an electrical signal and configured to accumulate therein the resulting electrical signal in accordance with an exposure period; and
   a pixel driving portion configured to control operations of said pixels in rows so as to carry out an electronic shutter operation and a reading operation of said pixel portion, and further configured to shorten a period of time for unnecessary output data, the unnecessary output data comprising data on an image for which the exposure period is not constant as a result of a mode change,
   wherein the mode change occurs during the exposure period, and the period of time for unnecessary output data is measured with a synchronous signal as a reference,
   wherein said pixel driving portion is configured to carry out resetting of electronic shutter addresses, for forcibly changing the electronic shutter addresses to an arbitrary start address when a first row or only a part of the electronic shutter addresses is accessed with the mode change as a trigger,
   wherein said pixel driving portion is configured to carry out the electronic shutter operation and the reading operation with the synchronous signal as the reference, and further configured to reset the electronic shutter addresses when the mode change occurs during the exposure period, thereby inhibiting the period of time for unnecessary output data from being generated.

2. A solid-state image pickup element, comprising:
   a pixel portion having a plurality of pixels disposed in a matrix, at least one of said pixels comprising a photoelectric conversion element configured to convert an optical signal into an electrical signal and configured to accumulate therein the resulting electrical signal in accordance with an exposure period; and
   a pixel driving portion configured to control operations of said pixels in rows so as to carry out an electronic shutter operation and a reading operation of said pixel portion, and further configured to shorten a period of time for unnecessary output data, the unnecessary output data comprising data on an image for which the exposure period is not constant as a result of a mode change,
   wherein the mode change occurs during the exposure period, and the period of time for unnecessary output data is measured with a synchronous signal as a reference,
   wherein said pixel driving portion is configured to carry out resetting of electronic shutter addresses, for forcibly changing the electronic shutter addresses to an arbitrary start address when a first row or only a part of the electronic shutter addresses is accessed with the mode change as a trigger,
   wherein said pixel driving portion is configured to carry out the electronic shutter operation and the reading operation with the synchronous signal as the reference, and determine whether or not the mode change occurs during the exposure period as a result of a change in a driving method, and further configured to reset the electronic shutter addresses when the mode change occurs during the exposure period, thereby inhibiting the period of time for unnecessary output data from being generated.

3. The solid-state image pickup element according to claim 1, wherein said pixel driving portion has a function of carrying out the electronic shutter operation and the reading operation with the synchronous signal as the reference, and interpolating a shortened frame in the phase of the mode change in which the change occurs in the exposure period of time, thereby shortening the period of time for the unnecessary output data.

4. The solid-state image pickup element according to claim 3, wherein said pixel driving portion has a function of carrying out the electronic shutter operation and the reading operation with the synchronous signal as the reference, and determining whether or not the change occurs in the exposure period of time in a phase of setting change for a driving method, and has a function of interpolating a shortened frame in the phase of the mode change in which the change occurs in the exposure period of time, thereby shortening the period of time for the unnecessary output data.

5. The solid-state image pickup element according to claim 3, wherein said pixel driving portion has a function of carrying out the electronic shutter operation and the reading operation with the synchronous signal as the reference, and interpolating a shortened frame in the phase of the mode change in which the change occurs in the exposure period of time, thereby shortening the period of time for the unnecessary output data, and has a function of inhibiting the shortened frame thus interpolated from being outputted as output data to an outside.

6. The solid-state image pickup element according to claim 3, wherein said pixel driving portion has a function of carrying out the electronic shutter operation and the reading operation with the synchronous signal as the reference, and determining whether or not the change occurs in the exposure period of time in a phase of setting change for a driving method, has a function of interpolating a shortened frame in the phase of the mode change in which the change occurs in the exposure period of time, thereby shortening the period of time for the unnecessary output data, and has a function of inhibiting the shortened frame thus interpolated from being outputted as output data to an outside.

7. A method of driving a solid-state image pickup element, comprising:

shortening a period of time for unnecessary output data, the unnecessary output data comprising data on an image for which an exposure period is not constant as a result of a mode change, wherein the mode change occurs during the exposure period, and the period of time for unnecessary output data is measured with a synchronous signal as a reference, said shortening occurring during the operation of a plurality of pixels disposed in a matrix, at least one of said pixels including a photoelectric conversion element configured to convert an optical signal into an electrical signal and configured to accumulate therein the resulting electrical signal in accordance with the exposure period, said operations controlled in rows so as to carry out an electronic shutter operation and a reading operation of a pixel portion in which said at least one pixel is disposed wherein resetting of electronic shutter addresses, for forcibly changing the electronic shutter addresses to an arbitrary start address is carried out when a first row or only a part of the electronic shutter addresses is accessed with the mode change as a trigger; and further comprising:

carrying out the electronic shutter operation and the reading operation with the synchronous signal as the reference, and resetting the electronic shutter addresses when the mode change occurs during the exposure period, thereby inhibiting the period of time for unnecessary output data from being generated.

8. A method of driving a solid-state image pickup element, comprising:

shortening a period of time for unnecessary output data, the unnecessary output data comprising data on an image for which an exposure period is not constant as a result of a mode change, wherein the mode change occurs during the exposure period, and the period of time for unnecessary output data is measured with a synchronous signal as a reference, said shortening occurring during the operation of a plurality of pixels disposed in a matrix, at least one of said pixels including a photoelectric conversion element configured to convert an optical signal into an electrical signal and configured to accumulate therein the resulting electrical signal in accordance with the exposure period, said operations controlled in rows so as to carry out an electronic shutter operation and a reading operation of a pixel portion in which said at least one pixel is disposed wherein resetting of electronic shutter addresses, for forcibly changing the electronic shutter addresses to an arbitrary start address is carried out when a first row or only a part of the electronic shutter addresses is accessed with the mode change as a trigger, wherein the electronic shutter operation and the reading operation are carried out with the synchronous signal as the reference; and further comprising determining whether or not the mode change occurs during the exposure period as a result of a change in a driving method, and resetting the electronic shutter addresses when the mode change occurs in the exposure period, thereby inhibiting the period of time for unnecessary output data from being generated.

9. The method of driving a solid-state image pickup element according to claim 7, wherein the electronic shutter operation and the reading operation are carried out with the synchronous signal as the reference, and a shortened frame is interpolated in the phase of the mode change in which the change occurs in the exposure period of time, thereby shortening the period of time for the unnecessary output data.

10. The method of driving a solid-state image pickup element according to claim 9, wherein the electronic shutter operation and the reading operation are carried out with the synchronous signal as the reference, it is determined whether or not the change occurs in the exposure period of time in a phase of setting change for a driving method, and a shortened frame is interpolated in the phase of the mode change in which the change occurs in the exposure period of time, thereby shortening the period of time for the unnecessary output data.

11. The method of driving a solid-state image pickup element according to claim 9, wherein the electronic shutter operation and the reading operation are carried out with the synchronous signal as the reference, a shortened frame is interpolated in the phase of the mode change in which the change occurs in the exposure period of time, thereby shortening the period of time for the unnecessary output data, and the shortened frame thus interpolated is inhibited from being outputted as output data to an outside.

12. The method of driving a solid-state image pickup element according to claim 9, wherein the electronic shutter operation and the reading operation are carried out with the synchronous signal as the reference, it is determined whether or not the change occurs in the exposure period of time in a phase of setting change for a driving method, a shortened frame is interpolated in the phase of the mode change in which the change occurs in the exposure period of time, thereby shortening the period of time for the unnecessary output data, and the shortened frame thus interpolated is inhibited from being outputted as output data to an outside.

13. A camera system, comprising:

a solid-state image pickup element;

an optical system configured to form an image of a subject on said solid-state image pickup element; and a signal processing circuit configured to process an output image signal from said solid-state image pickup element, wherein said solid-state image pickup element includes a pixel portion having a plurality of pixels disposed in a matrix, at least one of said pixels comprising a photoelectric conversion element configured to convert an optical signal into an electrical signal and configured to accumulate therein the resulting electrical signal in accordance with an exposure period, and a pixel driving portion configured to control operations of said pixels in rows so as to carry out an electronic shutter operation and a reading operation of said pixel portion, and further configured to shorten a period of time for unnecessary output data, the unnecessary output data comprising data on an image for which the exposure period is not constant as a result of a mode change, wherein the mode change occurs during the exposure period, and the period of time for unnecessary output data is measured with a synchronous signal as a reference, wherein said pixel driving portion is configured to carry out resetting of electronic shutter addresses, for forcibly changing the electronic shutter addresses to an arbitrary start address when a first row or only a part of the electronic shutter addresses is accessed with the mode change as a trigger, further configured to carrying the electronic shutter operation and the reading operation with the synchronous signal as the reference, and further configured to reset the electronic shutter addresses when the mode change occurs during the exposure period, thereby inhibiting the period of time for unnecessary output data from being generated.

14. The camera system according to claim 13, wherein said pixel driving portion has a function of carrying out the electronic shutter operation and the reading operation shutter with the synchronous signal as the reference, and interpolating a shortened frame in the phase of the mode change in which the change occurs in the exposure period of time, thereby shortening the period of time for the unnecessary output data.

15. A camera system, comprising:
a solid-state image pickup element;
an optical system configured to form an image of a subject on said solid-state image pickup element; and
a signal processing circuit configured to process an output image signal from said solid-state image pickup element,
wherein said solid-state image pickup element includes
a pixel portion having a plurality of pixels disposed in a matrix, at least one of said pixels comprising a photoelectric conversion element configured to convert an optical signal into an electrical signal and configured to accumulate therein the resulting electrical signal in accordance with an exposure period,
a pixel driving portion configured to control operations of said pixels in rows so as to carry out an electronic shutter operation and a reading operation of said pixel portion,
said pixel driving portion configured to shorten a period of time for unnecessary output data,
said pixel driving portion configured to carry out the electronic shutter control for a blanking period of time of a synchronous signal, carry out the reading operation synchronously with the synchronous signal, and start the electronic shutter control again for the blanking period of time of the synchronous signal following a mode change in accordance with setting of an exposure period of time following the mode change with the synchronous signal as a reference, and wherein the blanking period of time of the synchronous signal following the mode change is longer than that in a phase of non-mode change, wherein said pixel driving portion is configured to carry out resetting of electronic shutter addresses, for forcibly changing the electronic shutter addresses to an arbitrary start address when a first row or only a part of the electronic shutter addresses is accessed with the mode change as a trigger, further configured to carrying the electronic shutter operation and the reading operation with the synchronous signal as the reference, and further configured to reset the electronic shutter addresses when the mode change occurs during the exposure period, thereby inhibiting the period of time for unnecessary output data from being generated.

16. The solid-state image pickup element according to claim 2, wherein said pixel driving portion has a function of carrying out the electronic shutter operation and the reading operation with the synchronous signal as the reference, and interpolating a shortened frame in the phase of the mode change in which the change occurs in the exposure period of time, thereby shortening the period of time for the unnecessary output data.

17. The method of driving a solid-state image pickup element according to claim 7, wherein the electronic shutter operation and the reading operation are carried out with the synchronous signal as the reference, and a shortened frame is interpolated in the phase of the mode change in which the change occurs in the exposure period of time, thereby shortening the period of time for the unnecessary output data.

18. The camera system according to claim 15, wherein said pixel driving portion has a function of carrying out the electronic shutter operation and the reading operation shutter with the synchronous signal as the reference, and interpolating a shortened frame in the phase of the mode change in which the change occurs in the exposure period of time, thereby shortening the period of time for the unnecessary output data.

* * * * *